(12) United States Patent
Stone

(10) Patent No.: US 11,915,240 B2
(45) Date of Patent: *Feb. 27, 2024

(54) SAME SCREEN QUICK PAY BUTTON

(71) Applicant: PAYPAL, INC., San Jose, CA (US)

(72) Inventor: Carl Stone, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/510,252

(22) Filed: Oct. 25, 2021

(65) Prior Publication Data
US 2022/0044246 A1 Feb. 10, 2022

Related U.S. Application Data

(63) Continuation of application No. 15/084,451, filed on Mar. 29, 2016, now Pat. No. 11,157,904, which is a continuation of application No. 12/495,765, filed on Jun. 30, 2009, now abandoned.

(51) Int. Cl.
| | |
|---|---|
| *G06Q 20/10* | (2012.01) |
| *G06Q 20/12* | (2012.01) |
| *G06Q 20/32* | (2012.01) |
| *G06Q 20/40* | (2012.01) |
| *G07F 7/10* | (2006.01) |
| *G06Q 30/0601* | (2023.01) |
| *G06Q 40/12* | (2023.01) |

(52) U.S. Cl.
CPC ......... *G06Q 20/4012* (2013.01); *G06Q 20/10* (2013.01); *G06Q 20/102* (2013.01); *G06Q 20/12* (2013.01); *G06Q 20/3267* (2020.05); *G06Q 30/0641* (2013.01); *G06Q 40/12* (2013.12); *G07F 7/1025* (2013.01)

(58) Field of Classification Search
CPC ............................................. G06Q 20/00–425
See application file for complete search history.

(56) References Cited

U.S. PATENT DOCUMENTS

| | | | | |
|---|---|---|---|---|
| 6,016,484 A | * | 1/2000 | Williams | G06Q 20/00 235/375 |
| 7,048,182 B2 | * | 5/2006 | Zettler | G06K 17/00 235/380 |
| 7,499,875 B1 | * | 3/2009 | May | G06Q 20/08 705/26.3 |

(Continued)

FOREIGN PATENT DOCUMENTS

| | | | |
|---|---|---|---|
| JP | 2005266699 A | * | 9/2005 |
| JP | 2007328569 A | * | 12/2007 |

OTHER PUBLICATIONS

Gao J., et al., "P2P-Paid: A Peer-to-Peer Wireless Payment System," Proceedings of the 2005 Second IEEE International Workshop on Mobile Commerce and Services, 2005, 10 pages.

*Primary Examiner* — John W Hayes
*Assistant Examiner* — Chenyuh Kuo
(74) *Attorney, Agent, or Firm* — HAYNES AND BOONE, LLP

(57) ABSTRACT

A payment button on a device, such as a mobile phone, allows the user to remain on the window or page from which an item was selected for purchase. When the user is ready to purchases, the button is selected, and the user simply enters an identifier, such as a password or PIN, and the transaction is processed. The button remains on the same screen and changes during different stages of the payment process.

20 Claims, 5 Drawing Sheets

(56) References Cited

U.S. PATENT DOCUMENTS

| | | | | |
|---|---|---|---|---|
| 7,502,760 B1* | 3/2009 | Gupta | G06Q 20/367 | 705/64 |
| 7,627,531 B2* | 12/2009 | Breck | G06Q 20/206 | 705/65 |
| 7,877,299 B2* | 1/2011 | Bui | G06Q 20/102 | 705/64 |
| 9,147,210 B2 | 9/2015 | Scipioni | | |
| 9,595,031 B1* | 3/2017 | Grassadonia | G06Q 20/102 | |
| 10,460,316 B2* | 10/2019 | Stone | G06Q 20/12 | |
| 2001/0021917 A1* | 9/2001 | Hatano | G06Q 30/0641 | 705/27.1 |
| 2002/0123972 A1* | 9/2002 | Hodgson | G06Q 20/3823 | 705/72 |
| 2002/0128977 A1* | 9/2002 | Nambiar | G06Q 20/388 | 705/64 |
| 2003/0004867 A1* | 1/2003 | Kight | G06Q 20/108 | 705/39 |
| 2003/0195859 A1* | 10/2003 | Lawrence | G06Q 20/02 | 705/75 |
| 2004/0098313 A1* | 5/2004 | Agrawal | H04L 9/40 | 705/26.8 |
| 2005/0108104 A1* | 5/2005 | Woo | G06Q 20/12 | 705/26.8 |
| 2006/0080226 A1 | 4/2006 | Pickering | | |
| 2006/0106681 A1* | 5/2006 | Shafron | G06Q 30/0601 | 705/26.1 |
| 2006/0107217 A1* | 5/2006 | Lu | G06Q 30/02 | 715/733 |
| 2006/0235758 A1* | 10/2006 | Schleicher | G06Q 20/10 | 705/26.1 |
| 2007/0022020 A1* | 1/2007 | Bernstein | G06Q 30/06 | 705/26.1 |
| 2007/0043626 A1* | 2/2007 | Duvall | G06Q 20/3674 | 705/26.8 |
| 2007/0271149 A1* | 11/2007 | Siegel | G06Q 30/0641 | 705/26.8 |
| 2008/0098290 A1* | 4/2008 | Williams | G06F 21/51 | 715/209 |
| 2008/0103923 A1* | 5/2008 | Rieck | G06Q 30/0635 | 705/26.41 |
| 2008/0134307 A1* | 6/2008 | Ashkenazi | H04L 63/0853 | 726/6 |
| 2008/0162294 A1* | 7/2008 | Brown | G06Q 30/06 | 705/26.1 |
| 2008/0162371 A1* | 7/2008 | Rampell | G06Q 40/00 | 705/80 |
| 2008/0301046 A1* | 12/2008 | Martinez | G06Q 20/10 | 705/39 |
| 2009/0132405 A1* | 5/2009 | Scipioni | G06Q 20/385 | 705/35 |
| 2009/0171847 A2* | 7/2009 | Bhambri | G06Q 30/06 | 705/59 |
| 2009/0228376 A1* | 9/2009 | Rollins | G06Q 30/02 | 705/30 |
| 2009/0228562 A1* | 9/2009 | Uchiyama | G06Q 10/107 | 709/206 |
| 2009/0248537 A1* | 10/2009 | Sarkeshik | G06Q 30/02 | 705/26.1 |
| 2009/0288012 A1* | 11/2009 | Hertel | G06Q 20/326 | 715/738 |
| 2010/0145861 A1* | 6/2010 | Law | G06Q 20/326 | 705/76 |
| 2010/0162139 A1* | 6/2010 | Beebe | G06F 3/0484 | 715/760 |
| 2010/0191947 A1* | 7/2010 | Shin | H04W 12/125 | 713/2 |
| 2010/0280944 A1* | 11/2010 | Low | G06Q 20/102 | 705/40 |
| 2010/0332351 A1* | 12/2010 | Stone | G06Q 20/4012 | 705/40 |
| 2011/0029400 A1* | 2/2011 | Scipioni | G06Q 20/12 | 705/26.4 |
| 2011/0320343 A1* | 12/2011 | Koh | G06Q 20/10 | 705/39 |
| 2012/0066090 A1* | 3/2012 | Gangapurkar | G06Q 20/12 | 705/26.41 |
| 2012/0078789 A1* | 3/2012 | Harrell | G06Q 20/12 | 705/44 |
| 2012/0185317 A1* | 7/2012 | Wong | G06Q 30/0222 | 705/14.23 |
| 2012/0209684 A1* | 8/2012 | Postrel | G06Q 40/04 | 705/14.23 |
| 2013/0080323 A1* | 3/2013 | Scipioni | G06Q 40/02 | 705/44 |
| 2013/0080325 A1* | 3/2013 | Schatt | G07F 19/206 | 705/44 |
| 2013/0159185 A1* | 6/2013 | Lee | G06Q 20/3672 | 705/44 |
| 2013/0346173 A1* | 12/2013 | Chandoor | G06Q 40/02 | 705/14.17 |
| 2014/0357295 A1* | 12/2014 | Skomra | H04W 12/069 | 455/456.1 |
| 2016/0210623 A1* | 7/2016 | Voege | G06Q 20/40 | |
| 2016/0210630 A1* | 7/2016 | Stone | G06Q 30/0641 | |
| 2016/0381612 A1* | 12/2016 | Gao | H04W 4/02 | 370/331 |
| 2021/0168140 A1* | 6/2021 | Canfield | G06F 21/31 | |

\* cited by examiner

SAME SCREEN QUICK PAY BUTTON

RELATED APPLICATIONS

This application is a continuation application of U.S. Utility application Ser. No. 12/495,765 filed on Jun. 30, 2009 and continuation of U.S. Utility application Ser. No. 15/084,451 filed on Mar. 29, 2016 which issued as U.S. Pat. No. 11,157,904 on Oct. 26, 2021 and are incorporated herein by reference in their entirety.

BACKGROUND

Field of the Invention

The present invention generally relates to on-line payments.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, CA Such payment providers can make transactions easier and safer for the parties. Purchasing through the Internet from the convenience of a consumer's home, office, or virtually anywhere (with mobile devices) is one main reason why on-line purchases are growing faster and faster.

Typical payment flows with on-line purchases provide the consumer with a payment or checkout button or link that is selected when the consumer is ready for payment. Once selected, such as by clicking, the consumer is taken to a new checkout or payment page. The consumer then enters any requested information and confirms payment. One disadvantage to this payment flow is that the consumer is taken away from the merchant or product page, which may lessen the consumer experience and preclude further shopping or browsing on the page. Another disadvantage is that the consumer may be required to enter information, such as credit card number, billing address, etc., which may be cumbersome and time-consuming.

These problems may be even more prevalent in small mobile devices, such as phones, having small screen sizes and keyboards or keypads. With mobile devices, the consumer may want to remain on the merchant or product/application page because Internet navigation is more difficult. Furthermore, the small keyboards/keypads make it more inconvenient to enter information onto a payment page.

Thus, there is a need for a more effective way of making on-line payments without the disadvantages discussed above.

SUMMARY

In accordance with an embodiment of the invention, a consumer, who has made a payment through a payment provider, such as PayPal, is able to select a payment button to make a payment for one or more selected items, products, applications, or digital goods. The payment button is on the merchant or application page. Once selected, either by clicking or tapping, the payment button changes to request the consumer to enter a password, PIN, or other identifier for the consumer account. Once entered, the consumer taps or selects the button again, and the button animates to show the payment being processed. Once completed, the button shows the payment sent. If the purchased good is an application or other digital good, downloading can automatically begin after confirmation of payment. Throughout the payment process, the payment button remains on the merchant or application page, and the consumer is not taken to a new payment page.

This type of payment button and flow can be specific to a device, where once the consumer makes an initial payment, the payment button will be available to the consumer in any subsequent payment transactions with the device. The payment button and flow may also be available in general on any device, as long as the consumer has set up the account with the payment provider, and the consumer enters information that properly identifies the consumer, consumer account, and maybe the device.

By keeping the payment button and flow on the same merchant or application page (instead of opening up a new window), the consumer is able to continue to look at both the item information and payment processing, and navigate to other pages if desired. Also, by allowing the consumer to enter a simple, easy-to-remember identifier, such as a PIN, password, phone number, or email, the consumer can quickly and easily make an on-line payment.

These and other features and advantages of the present invention will be more readily apparent from the detailed description of the embodiments set forth below taken in conjunction with the accompanying drawings.

Figure 1:
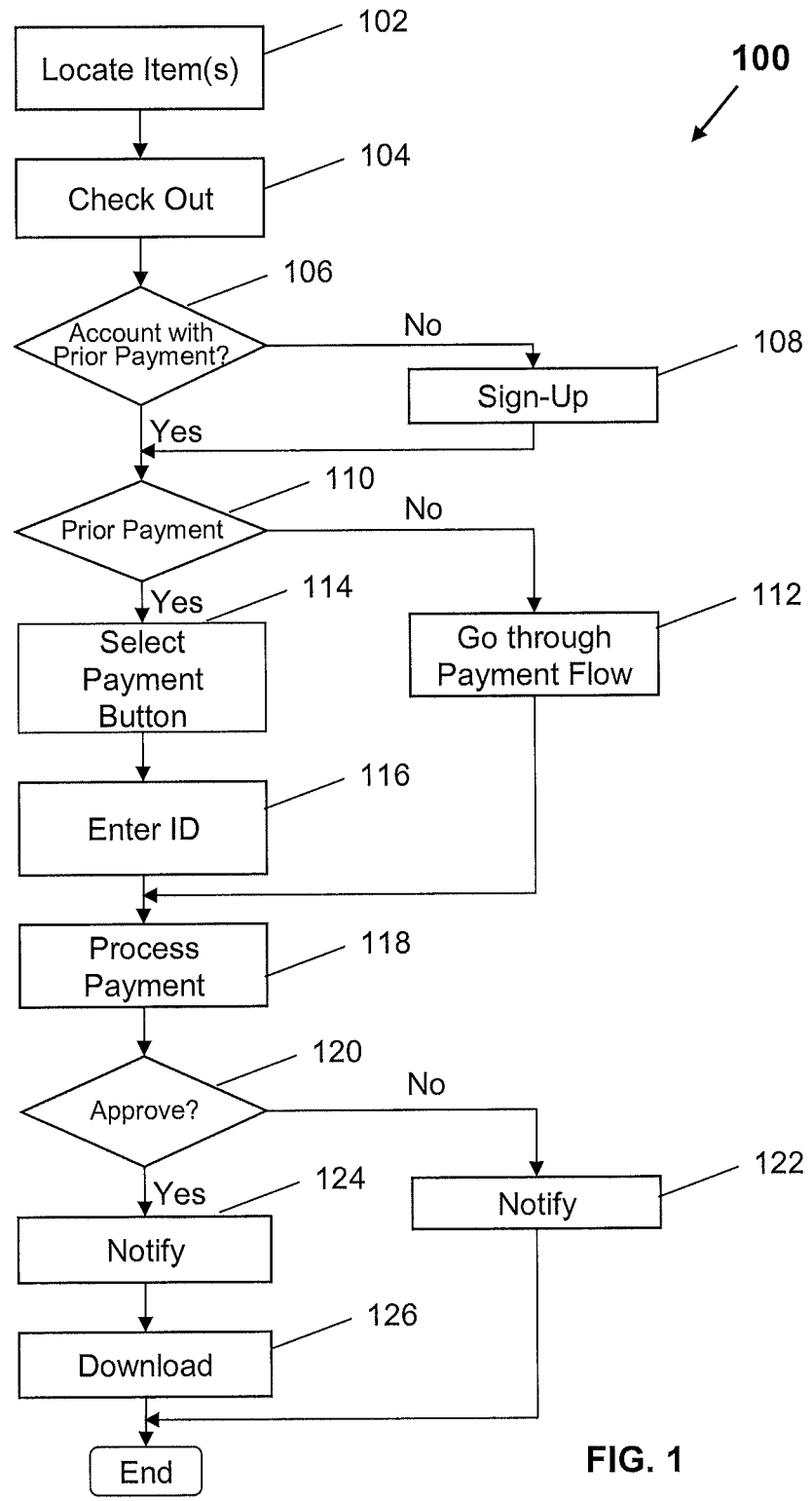
FIG. 1 is a flowchart showing a process for making an on-line payment according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for making an on-line payment according to one embodiment of the present disclosure. At step I 02, the consumer locates an item or items for purchase. This can be done through any device with an Internet browser, such as a mobile phone, PDA, PC, etc. Thus, an item can be located by browsing the Internet, finding an appropriate merchant or retailer site, and selecting the item for purchase. Locating an item can also include selecting an application or digital good from an on-line store. Such items are simply downloaded onto a consumer or recipient device, as opposed to a physical good that is received at a physical location. Examples of digital goods include an image, such as to send to someone else on a networking site or for personal use, such as for an avatar. Applications may include applications available through a store such as iTunes for the iPhone by Apple.

Once the item(s) are located, the consumer proceeds to checkout or payment at step 104. In one embodiment, the merchant page or applications details page includes a payment button that the user can select when ready for checkout or payment. Selection can be made by tapping or clicking on the button. The payment button may include the name of the payment provider, such as PayPal, Inc. of San Jose, CA If the consumer does not have an account with the payment provider, as determined at step 106, the consumer is taken to a page where the consumer can sign up for an account at step 108. This may include opening a new window for the payment provider site, which may request specific information about the consumer. In one embodiment, the information includes some combination of the consumer's name, billing address, mailing address, credit card information, bank account information, user name, and password or PIN. The payment provider may also request whether the consumer wants to set limits on the account, either in general or for "quick payments," which is a way for consumers to quickly pay for an item. Limits may include daily dollar limits, transaction limits (both in number and/or in dollars), and monthly dollar limits.

In one embodiment, after the consumer as signed up for the payment account or if the consumer has an established account, a determination is made at step 110 as to whether the consumer has made a payment or quick payment through the payment provider account. If the consumer has not made a payment through the payment provider, which can be on the specific device, on any device, or using a specific payment option of the payment provider (i.e., some sort of "quick pay" in different embodiment, the consumer must first go through a payment flow at step 112. For example, the payment flow may include having the consumer enter an email, phone number, password, and/or PIN, either in the same window or in anew window. After the requested information is entered, the payment request is processed at step 118.

If the consumer has made a suitable payment through the payment provider, as determined at step 110, a payment button appears on the same screen as the merchant or application page. The button may appear after a successful purchase through the merchant or application. This button may be different than a payment button for the payment provider when the consumer has not gone through a suitable payment flow. With the payment button on the same page, the consumer selects this button at step 114 to initiate payment. The button may be selected by tapping or clicking on it. Note that in other embodiments, the determination at step 110 is skipped, such that after a consumer has an account with the payment provider, the consumer proceeds directly to step 114.

Once the button is selected, the button changes to request the consumer to enter a password, PIN, or other identifier. This may be simply indicated with something like "Enter Password." In one embodiment, the customer then enters the requested information, such as by typing on a keyboard or virtual keypad, at step 116. In another embodiment, the consumer first taps or clicks on the button before entering the information. For example, tapping or clicking on the button may replace the message (e.g., "Enter Password") with a blank field and cursor indicator at the beginning of the field. After entering the requested information, the consumer transmits the information, such as by hitting a return button on the keyboard or tapping or clicking on the button again. Communication of the information may be by any means, such as through the Internet, Bluetooth, or a wired connection, using suitable components such as antennas and processors. The button changes again, indicating that the payment request is being processed, at step 118. The button may animate to show the request is processing or simply flash a message like "Processing . . . "

Processing may be conventional for the payment provider. For example, the password or requested information is transmitted to the payment provider. The payment provider searches its database for a matching password or information. The payment provider may also compare information about the device the request was transmitted from (such as a phone number from a mobile device) to information corresponding to an authorized account. The payment provider also processes purchase information, such as the price of the item(s). After processing, the payment provider determines whether the payment request is approved at step 120. A decline of the request can be for various reasons, including incorrect password or identifier or purchase request exceeds a pre-set limit, such as a dollar limit or a transaction number limit. If the request is declined, the consumer and/or merchant can be notified at step 122. Notification may be on the button, a separate window, text message, or any suitable mode. The notification may also include the reason for the decline, and may allow the consumer to re-enter the password.

If, as determined at step 120, the payment request is approved, the button on the customer device changes to notify the customer at step 124. The notification may be a simple message on the button, such as "Payment Sent" or "Approved." If the purchased item is a downloadable item, such as an application, the download may begin, at step 126, automatically as soon as the payment is approved or sent. After the download is completed, the consumer will have the item on the device. If the purchased item is a physical good, the merchant can deliver the item by a suitable method, such as shipping or arranging a physical pick-up. After the payment has been approved, the payment button may remain on the screen or disappear. The consumer can then continue shopping or navigate to other pages for possible further purchases using the same screen payment button.

Figure 2:
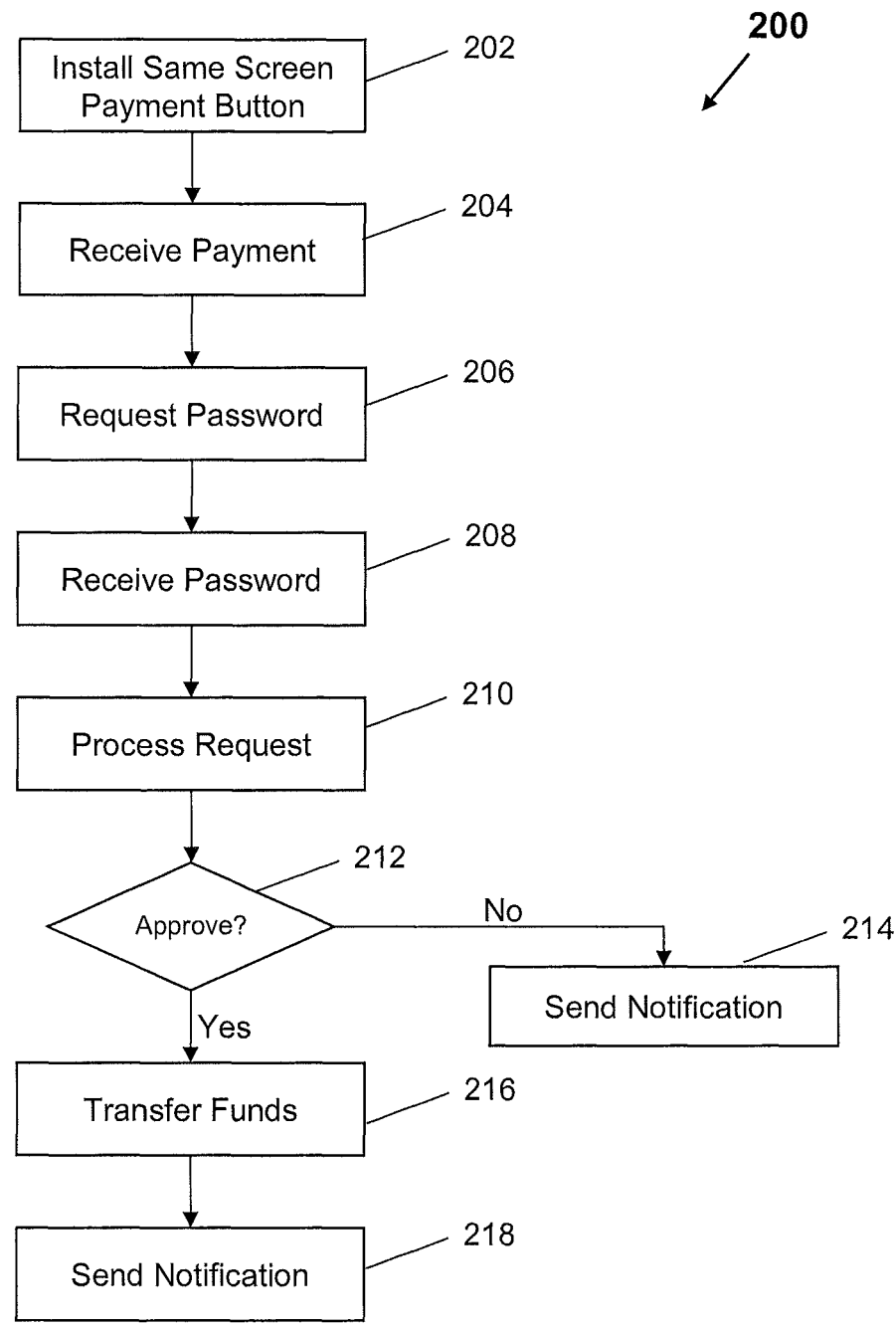
FIG. 2 is a flowchart showing a process performed by a payment provider for processing an on-line payment according to one embodiment.

FIG. 2 is a flowchart 200 showing steps performed by a payment provider to process an on-line payment, according to one embodiment. At step 202, the payment provider installs the payment button on a consumer's device, such as a mobile phone. Installation of the payment button may be by any suitable means, such as through the Internet, Bluetooth, Near Field Communications (NFC), WiFi, or a wired connection, using suitable components such as antennas and processors of the user device and payment provider. The button or "same screen quick pay button," as described herein, remains on the same screen as the merchant site or application page. Note that certain conditions may have to be met before the same screen quick pay button is made available to the consumer. For example, in addition to having an account with the payment provider, the consumer may also be required to have made a payment on the device through the payment provider, signed up for the feature (e.g., setting limits on payments made through the button), and/or made an on-line payment through the payment provider on any device.

Once installed and available to the consumer, the payment provider waits for a payment request from the consumer using the payment button. The payment request is received, at step 204, when the consumer selects the payment button. Upon receipt of the request, the payment provider sends to the device a request for a password or other identifier at step 206. The payment provider then receives a password from the consumer at step 208. Once all the necessary information is received, the payment provider processes the request at step 210. Necessary information may include the consumer's password or ID, the consumer device ID (e.g., phone number), purchase information (e.g., amount, item(s), description), and/or merchant information. This information may be communicated or transmitted to the payment provider at once or separately, such as at step 204 when the payment request is first received and/or at step 208 when the password is received.

Using the information, the payment provider determines, at step 212, whether to approve the payment request. The approval determination can be based on any suitable criteria of the payment provider, including valid account, not exceeding pre-set spending/transaction limits, and/or valid user. If the payment request is denied, the payment provider sends a notification at step 214. The notification can be sent to the consumer and/or the merchant and may include reasons for the denial.

If the payment request is approved, the payment provider transfers the requested funds, at step 216, from the consumer's account to the merchant or recipient. If the merchant or recipient also has an account with the payment provider, the funds are simply transferred between accounts. If the merchant does not have an account with the payment provider, the payment provider may transfer the funds to a designated account, such as a bank account with a routing and account number, or the payment provider may request the merchant to sign up for an account with the payment provider to receive the funds. Once the funds are transferred, the payment provider sends a notification, at step 218, to the consumer and/or the merchant. At that time, the payment portion of the transaction is completed by the payment provider.

Note that the payment button may appear during various times when the user is using a device. For example, if the user is playing a game on the device and wishes to purchase a next level of the game or an upgrade, the payment button may appear so that the user can stay on the game page and quickly and easily purchase the next level or upgrade. The game may be then be upgraded with a download from the game developer or other entity.

Figure 3:
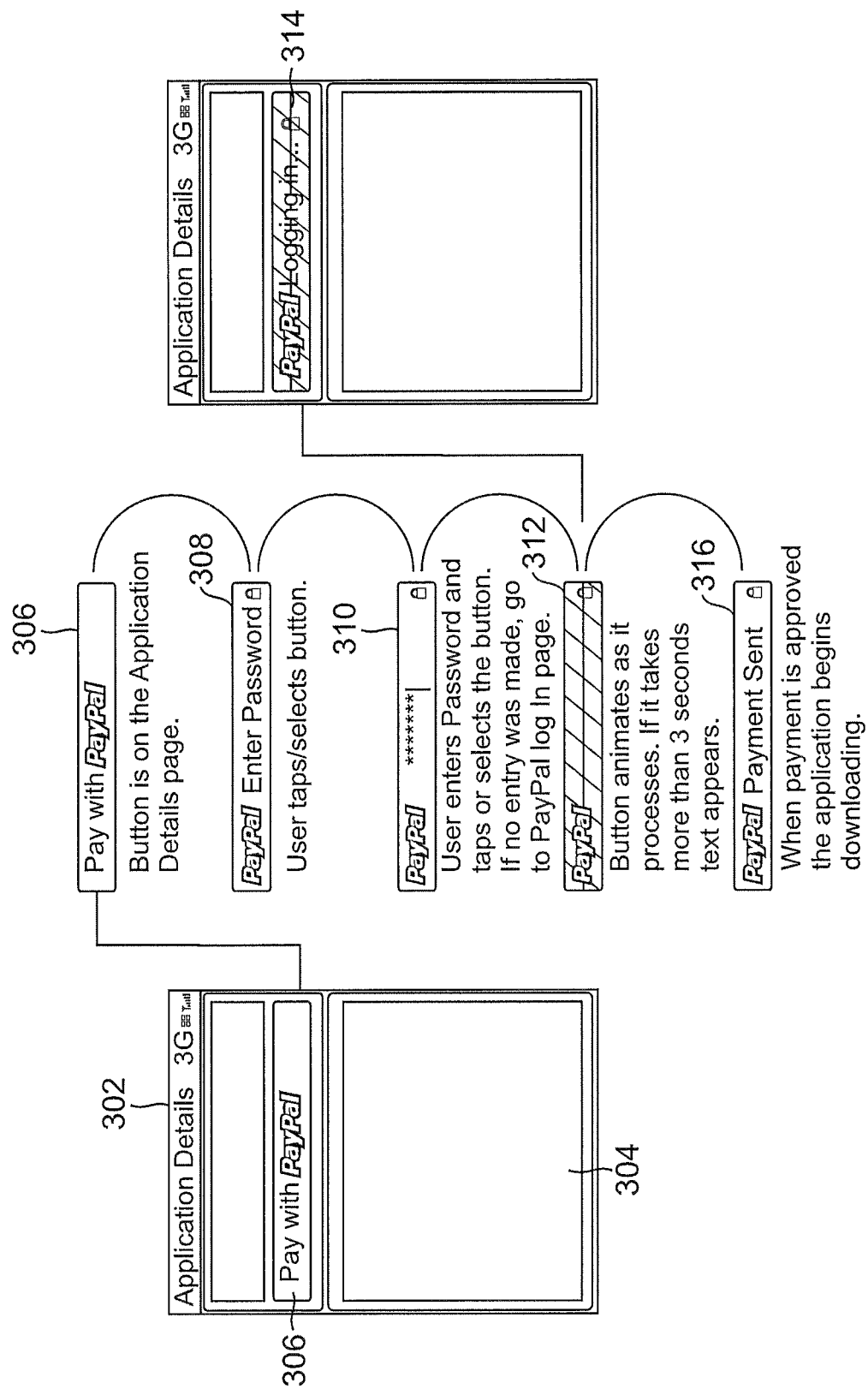
FIG. 3 shows various stages of a payment button through a payment process according to one embodiment.

FIG. 3 shows a screen 302 of a mobile device, along with various stages of a payment button during a payment process, according to one embodiment. In this example, the mobile device is a phone. Screen 302 includes a merchant or application details page 304 and a payment button 306. When the consumer is ready to pay and selects payment button 306, the button changes to request entry of a password, shown as button 308. The consumer then selects the button and enters the requested password or information onto the button, as shown in button 310. The button then animates, such as a moving checkerboard, shown as button 312, to show the request being processed. In one embodiment, if a certain time has passed, such as three seconds, text appears on the button. This is shown as button 314, with the text indicating to the consumer that the transaction is still processing. The text can be "Logging in . . . ," as shown, or other text, such as "Processing . . . " After processing, assuming the payment request was approved, the button again changes to indicate the payment was sent, shown as button 316. Note that throughout the different changes in the payment button, the button remains on same screen or window as the merchant or application page, i.e., the user continues to be able to view the merchant or application page while making the on-line payment.

Figure 4:
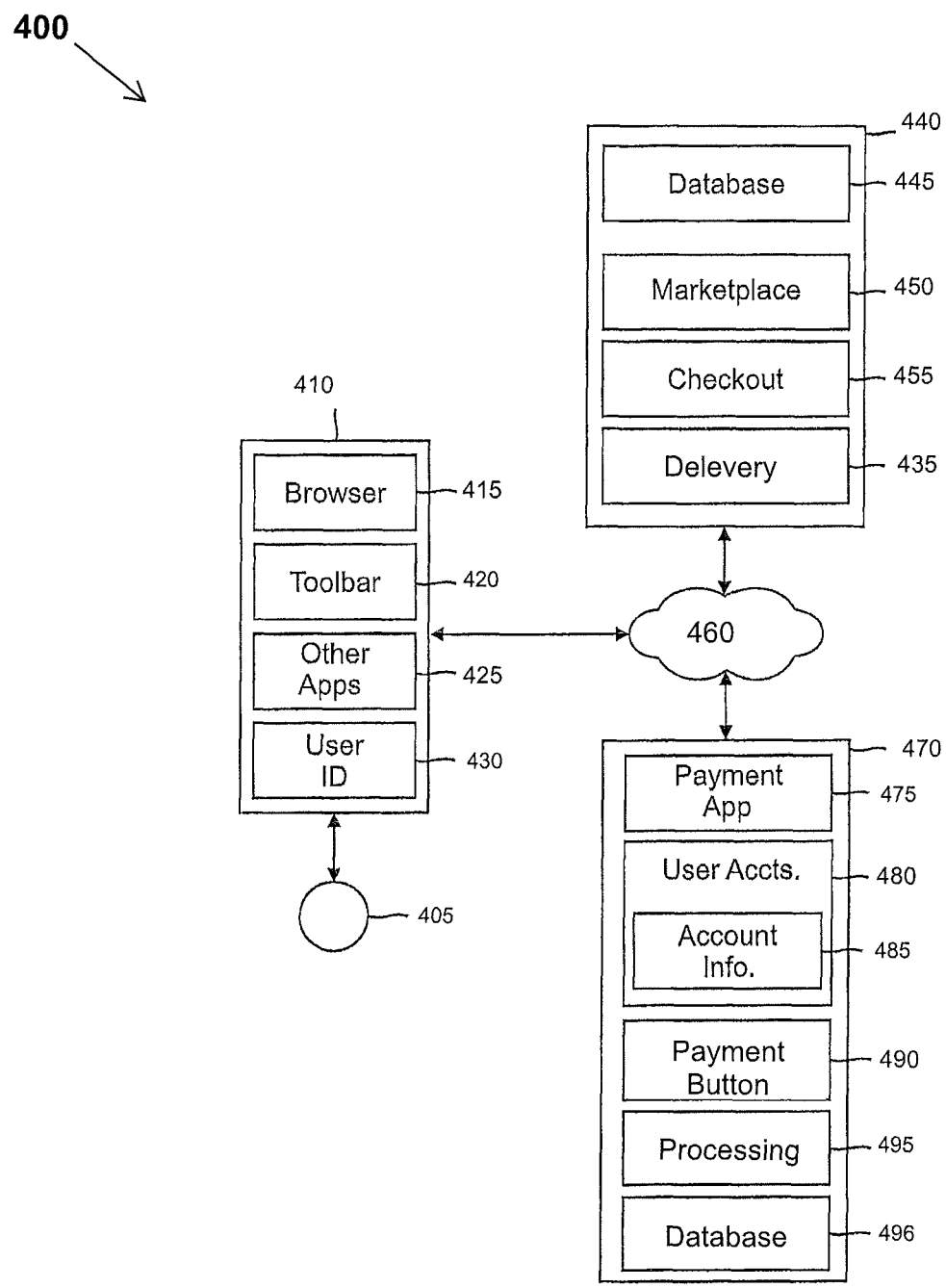
FIG. 4 is a block diagram of a networked system used in an on-line payment flow with an embodiment of the invention.

FIG. 4 is a block diagram of a networked system 400 used in an on-line payment flow according to an embodiment of the invention. System 400 includes a client device 410, a merchant server 440, and a payment service provider server 470 in communication over a network 460. Payment service provider server 470 may be maintained by a payment provider, such as PayPal, Inc. of San Jose, CA Client device 410, merchant server 440, and payment service provider server 470 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

Client device 410 may be implemented using any appropriate combination of hardware and/or software configured for wired and/or wireless communication over network 460. For example, in one embodiment, client device 410 may be implemented as a personal computer of a user 405 in communication with the Internet. In other embodiments, client device 410 may be implemented as a wireless telephone, personal digital assistant (PDA), notebook computer, and/or other types of computing devices.

As shown, client device 410 may include one or more browser applications 415 which may be used, for example, to provide a convenient interface to permit user 405 to browse information available over network 460. For example, in one embodiment, browser application 415 may be implemented as a web browser configured to view information available over the Internet.

Client device 410 may also include one or more toolbar applications 420 which may be used, for example, to provide client-side processing for performing desired tasks in response to operations selected by user 405. In one embodiment, toolbar application 420 may display a user interface in connection with browser application 415.

Client device 410 may further include other applications 425 as may be desired in particular embodiments to provide desired features to client device 410. In particular, applications 425 may include a payment application and button, such as described herein for same screen quick payments through a payment provider. Applications 425 may also include security applications for implementing client-side security features, programmatic client applications for interfacing with appropriate application programming interfaces (APIs) over network 460, or other types of applications. Email applications may also be included, which allow user 405 to send and receive emails through network 460. Client device 410 includes one or more user and/or device identifiers 430 which may be implemented, for example, as operating system registry entries, cookies associated with browser application 415, identifiers associated with hardware of client device 410, or other appropriate identifiers, such as a phone number. In one embodiment, user identifier 430 may be used by a payment service provider to associate user 405 with a particular account maintained by the payment service provider as further described herein.

Merchant server 440 may be maintained, for example, by an on-line merchant or application developer offering various products and/or services in exchange for payment to be received over network 460, including digital goods and applications. In this regard, merchant server 440 includes a database 445 identifying available products and/or services (e.g., collectively referred to as items) which may be made available for viewing and purchase by user 405. Accordingly, merchant server 440 also includes a marketplace application 450 which may be configured to provide information over network 460 to browser 415 of client device 410. For example, in one embodiment, user 405 may interact with marketplace application 450 through browser applications over network 460 in order to search and view various products or services identified in database 445.

Merchant server 440 also includes a checkout application 455 which may be configured to facilitate the purchase by user 405 of goods or services identified by marketplace application 450. In this regard, checkout application 455 may be configured to accept payment information from user 405 and/or from payment service provider server 470 over network 460.

In one embodiment, merchant server 440 further includes a delivery application 435 which may be configured to deliver a digital or downloadable item to client device 410. For example, if user 405 purchases a downloadable item from merchant, delivery application 435 has the ability to transmit or download the item onto client device 410 after payment is confirmed by payment service provider server 470.

Payment service provider server 470 may be maintained, for example, by an online payment service provider which may provide payment on behalf of user 405 to the operator of merchant server 440. In this regard, payment service provider server 470 includes one or more payment applications 475 which may be configured to interact with client device 410 and/or merchant server 440 over network 460 to facilitate the purchase of goods or services by user 405 of client device 410 from a merchant operating server 440. In one embodiment, payment service provider server 470 may be maintained by PayPal, Inc.

Payment service provider server 470 also maintains a plurality of user accounts 480, each of which may include account information 485 associated with individual users. For example, in one embodiment, account information 485 may include private financial information of users of devices such as account numbers, passwords, credit card information, bank information, or other financial information which may be used to facilitate online transactions by user 405, as well as device information from a phone or PC that aids in determining whether a payment request is to be approved. Payment application 475 may be configured to interact with merchant server 440 on behalf of user 405 during a transaction with checkout application 455 and delivery application 435 to track and manage purchases made by users.

In particular, payment service provider server 470 also provides a payment button application 490 which may be configured load or install the payment button onto client device 410. A payment button processing application 495 may be configured to receive payment request information via the payment button selected by users, process the payment request, and store/retrieve information as needed in a database 496. Payment button application 490, processing application 495 and/or database 496 may be part of payment application 475.

Figure 5:
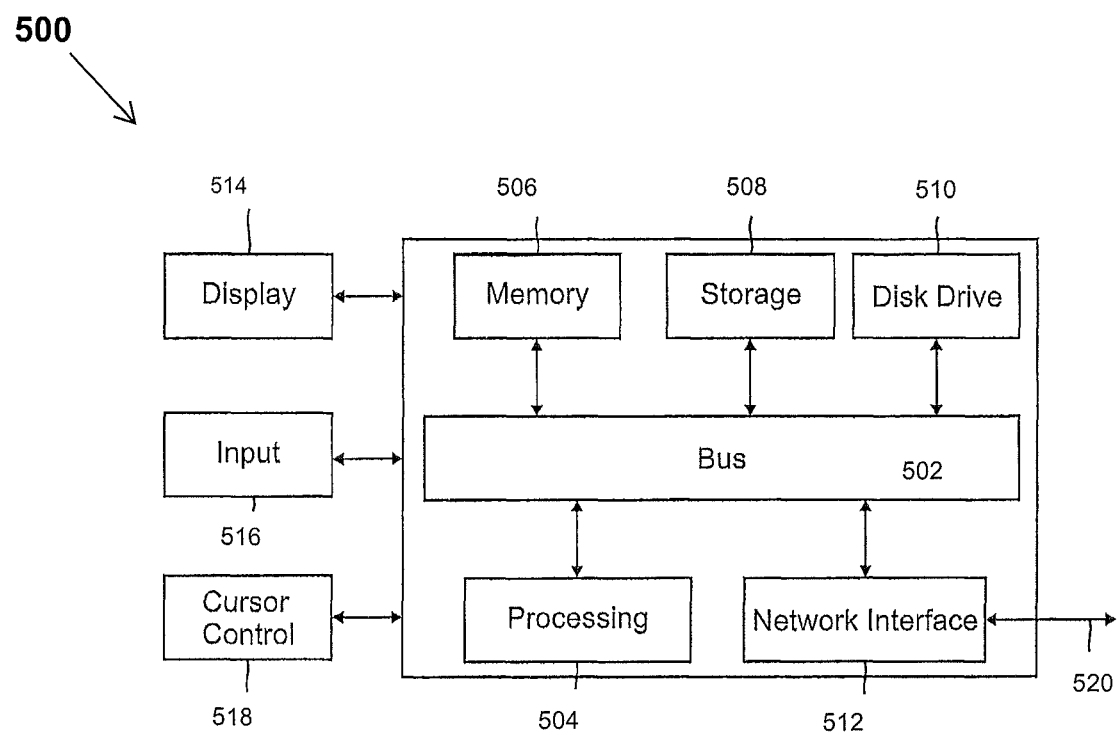
FIG. 5 is a block diagram of a computer system suitable for implementing one or more embodiments of the present disclosure.

FIG. 5 is a block diagram of a computer system 500 suitable for implementing one or more embodiments of the present disclosure. In various implementations, the user device may comprise a personal computing device (e.g., a personal computer, laptop, cell phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 500, such as a personal computer and/or a network server, includes a bus 502 or other communication mechanism for communicating information, which interconnects subsystems and components, such as a processing component 504 (e.g., processor, micro-controller, digital signal processor (DSP), etc.), a system memory component 506 (e.g., RAM), a static storage component 508 (e.g., ROM), a disk drive component 510 (e.g., magnetic or optical), a network interface component 512 (e.g., modem or Ethernet card), a display component 514 (e.g., CRT or LCD), an input component 516 (e.g., keyboard, keypad, or virtual keyboard), and a cursor control component 518 (e.g., mouse, pointer, or trackball). In one implementation, disk drive component 510 may comprise a database having one or more disk drive components.

In accordance with embodiments of the present disclosure, computer system 500 performs specific operations by processor 504 executing one or more sequences of instructions contained in system memory component 506, such as described above with respect to the consumer and/or payment provider in FIGS. 1-3. Such instructions may be read into system memory component 506 from another computer readable medium, such as static storage component 508 or disk drive component 510. In other embodiments, hard-wired circuitry may be used in place of or in combination with software instructions to implement the present disclosure.

Logic may be encoded in a computer readable medium, which may refer to any medium that participates in providing instructions to processor 504 for execution. Such a medium may take many forms, including but not limited to, non-volatile media, volatile media, and transmission media. In various implementations, non-volatile media includes optical or magnetic disks, such as disk drive component 510, volatile media includes dynamic memory, such as system memory component 506, and transmission media includes coaxial cables, copper wire, and fiber optics, including wires that comprise bus 502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by a communication link 520 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 520 and a communication interface 512. Network interface component 512 may include an antenna, either separate or integrated, to enable transmission and reception via communication link 520. Received program code may be executed by processor 504 as received and/or stored in disk drive component 510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the payment button and processing has been described with respect to a payment provider, but some or all of the features and steps may be associated with a mobile platform and/or a merchant. Having thus described embodiments of the present disclosure, persons of ordinary skill in the art will recognize that changes may be made in form and detail without departing from the scope of the present disclosure. Thus, the present disclosure is limited only by the claims.

What is claimed:

1. A system, comprising:
   one or more hardware processors; and
   a non-transitory memory storing instructions that when executed by the one or more hardware processors, cause the one or more hardware processors to perform operations comprising:
   receiving, via a network connection, a purchase request to purchase an item from a website, wherein the purchase request is initiated by a selection of a buy button displayed on the website with the item on a user interface of a user device of a user;
   determining an account associated with the user;
   transmitting, via the network connection, an authentication request to the user device;
   transforming, in response to a user interaction of the buy button, the buy button at least in part by including a text entry field in the buy button, wherein a rest of the user interface remains unchanged while the buy button is transformed;
   receiving user authentication credentials received through the text entry field, the user authentication credentials including a user PIN or a password but not billing information; and
   processing the purchase request based on the user authentication credentials while the user interface continues to display at least a portion of the website.

2. The system of claim 1, wherein the authentication request is displayed on the buy button before the transforming.

3. The system of claim 1, wherein the determining comprises determining that the account associated with the user device was previously established.

4. The system of claim 1, wherein the operations further comprise determining that a new account is needed to process the purchase request and transmitting a request to open the new account associated with the user of the user device.

5. The system of claim 1, wherein the operations further comprise:
   transforming, after the user authentication credentials are accessed received, the text entry field by including a first button that displays an animation indicating the purchase request is being processed; and
   transforming, after the purchase request has been processed, the first button to include a second button displaying a message regarding the processing of the purchase request.

6. The system of claim 1, wherein the processing the purchase request includes determining whether a payment is approved.

7. The system of claim 6, wherein the operations further comprise:
   based on a determination that the payment is not approved, transmitting, to the user device, a notification that is presented on the user interface.

8. The system of claim 1, wherein the operations further comprise:
   before the purchase request is received, causing the buy button to be installed in the user interface of the user device.

9. A method, comprising:
   receiving, via a network connection, a purchase request to purchase an item from a website, wherein the purchase request is initiated by a selection of a buy button displayed on the website with the item on a user interface of a user device of a user;
   analyzing the purchase request received;
   determining an account associated with the user;
   transmitting, via the network connection, an authentication request to the user device;
   detecting a user interaction of the buy button;
   transforming, in response to the detected user interaction of the buy button, the buy button at least in part by including a text entry field in the buy button, wherein a rest of the user interface remains unchanged while the buy button is transformed;

receiving user authentication credentials received least in part through the text entry field, the user authentication credentials including a user PIN or a password but not billing information; and processing the purchase request based on the user authentication credentials while the user interface remains on the website.

10. The method of claim 9, wherein the authentication request is displayed on the buy button before the text entry field is displayed as the part of the buy button.

11. The method of claim 9, further comprising determining that the account associated with the user device was previously established.

12. The method of claim 9, further comprising determining that a new account is needed for processing the purchase request, and wherein the method further comprises transmitting a request to open the new account associated with the user of the user device.

13. The method of claim 9, further comprising: before the purchase request is received, causing the buy button to be installed in the user interface of the user device.

14. The method of claim 9, wherein the processing the purchase request includes determining whether a payment is approved.

15. The method of claim 14, further comprising: based on a determination that the payment is not approved, transmitting a notification that is presented on the user interface.

16. The method of claim 9, further comprising: after the purchase request has been processed, displaying a confirmation of a payment on the buy button.

17. A non-transitory computer readable medium having stored thereon machine-readable instructions executable to cause a machine to perform operations comprising:

causing a buy button to be made accessible in a user interface of a user device of a user when the user interface displays a website of a merchant;

detecting a selection, via the user interface, of the buy button displayed on the website of the merchant;

determining that the selection of the buy button corresponds to a purchase request to purchase an item from the website of the merchant;

locating an account associated with the user of the user device;

transmitting an authentication request to the user device;

transforming, in response to a user interaction of the buy button, the buy button at least in part by including a text entry field in the buy button, wherein a rest of the user interface remains unchanged while the buy button is transformed;

receiving user authentication credentials received at least in part through the text entry field, the user authentication credentials including a user PIN or a password but not billing information; and processing the purchase request based on the user authentication credentials while the user interface continues to display at least a portion of the website.

18. The non-transitory machine-readable medium of claim 17, wherein the authentication request is displayed on the buy button before the text entry field is generated.

19. The non-transitory machine-readable medium of claim 17, wherein the determining comprises that the account associated with the user device was previously established.

20. The non-transitory machine-readable medium of claim 17, wherein the operations further comprise: after the purchase request has been processed, displaying a confirmation of a payment on the buy button.

* * * * *